United States Patent [19]

Van Patten

[11] Patent Number: 4,736,731
[45] Date of Patent: Apr. 12, 1988

[54] RAPID ACTING ELECTRO-PNEUMATIC ANTI-G SUIT CONTROL VALVE

[75] Inventor: Robert E. Van Patten, Bellbrook, Ohio

[73] Assignee: The United States of America as represented by the Secretary of the Air Force, Washington, D.C.

[21] Appl. No.: 831,901

[22] Filed: Feb. 24, 1986

[51] Int. Cl.$^4$ ............................................. A61H 1/00
[52] U.S. Cl. ..................................... 128/1 A; 137/38
[58] Field of Search .................. 128/1 A, 24 R, 25 R, 128/38, 40, 30.2, 204.23, 204.29; 137/38, 39

[56] References Cited

U.S. PATENT DOCUMENTS

| | | | |
|---|---|---|---|
| 2,397,710 | 4/1946 | Versoy et al. | 128/1 A |
| 2,683,001 | 7/1954 | MacIntyre | 244/1 |
| 2,760,484 | 8/1956 | Ferwerda | 128/1 |
| 3,089,482 | 5/1963 | Gray | 128/1 A |
| 3,780,723 | 12/1973 | Van Patten | 128/1 A |
| 4,215,712 | 8/1980 | Shaffstall et al. | 128/1 A |
| 4,219,039 | 8/1980 | Jaggars | 128/1 A |
| 4,230,097 | 10/1980 | Beaussant et al. | 128/1A |
| 4,243,024 | 1/1981 | Crosbie et al. | 128/1A |
| 4,336,590 | 6/1982 | Jacq et al. | 364/418 |
| 4,534,338 | 8/1985 | Crosbie et al. | 128/1 A |
| 4,546,491 | 10/1985 | Beaussant | 2/2.1 A |
| 4,583,822 | 4/1986 | Aronne | 128/1 A |
| 4,638,791 | 1/1987 | Krogh et al. | 128/1 A |

OTHER PUBLICATIONS

R. E. Van Patten, T. J. Jennings, W. Albery, J. W. Frazier, and C. Goodyear "Development of an Electro-Pneumatic Anti-G Valve for High Performance Fighter Aircraft", Proceedings of the 22nd Annual Symposium of the SAFE Association, pp. 112-116, Dec. 1984.

Primary Examiner—Edward M. Coven
Assistant Examiner—K. M. Reichle
Attorney, Agent, or Firm—Donald J. Singer; Fredric L. Sinder

[57] ABSTRACT

A novel anti-G suit valve system is disclosed which provides very rapid response to imminent high acceleration. The disclosed embodiments of the new valve system can be retrofitted to existing mechanical anti-G valves to create a hybrid valve system capable of achieving the desired qualities of fast triggering of the valve in response to imminent acceleration and maximum rate inflation of the anti-G suit. The new valve system measures acceleration and, by differentiation, the rate of change of acceleration. When both acceleration and rate of change of acceleration exceed preselected values, a solenoid mounted in place of the press-to-test button on a mechanical anti-G valve is energized for a preselected period of time to fully depress the valve spindle, providing maximum rate delivery of pressurized air. The hybrid valve reverts to normal operation at the end of the preselected period of time. Another embodiment monitors an aircraft computer control system digital data bus and adds the requirement of detecting preselected signal values from the data bus to trigger the delivery of pressurized air. A modification of this embodiment requires only the detection of the preselected data bus signal values to intitiate maximum rate delivery of pressurized air for the preselected period of time. The anti-G suit valve system may also be operated by manually determining the imminent likeihood of high acceleration and manually actuating the maximum rate delivery of pressurized air. The valve automatically ceases delivery of the manually actuated pressurized air delivery after a preselected period of time.

12 Claims, 3 Drawing Sheets

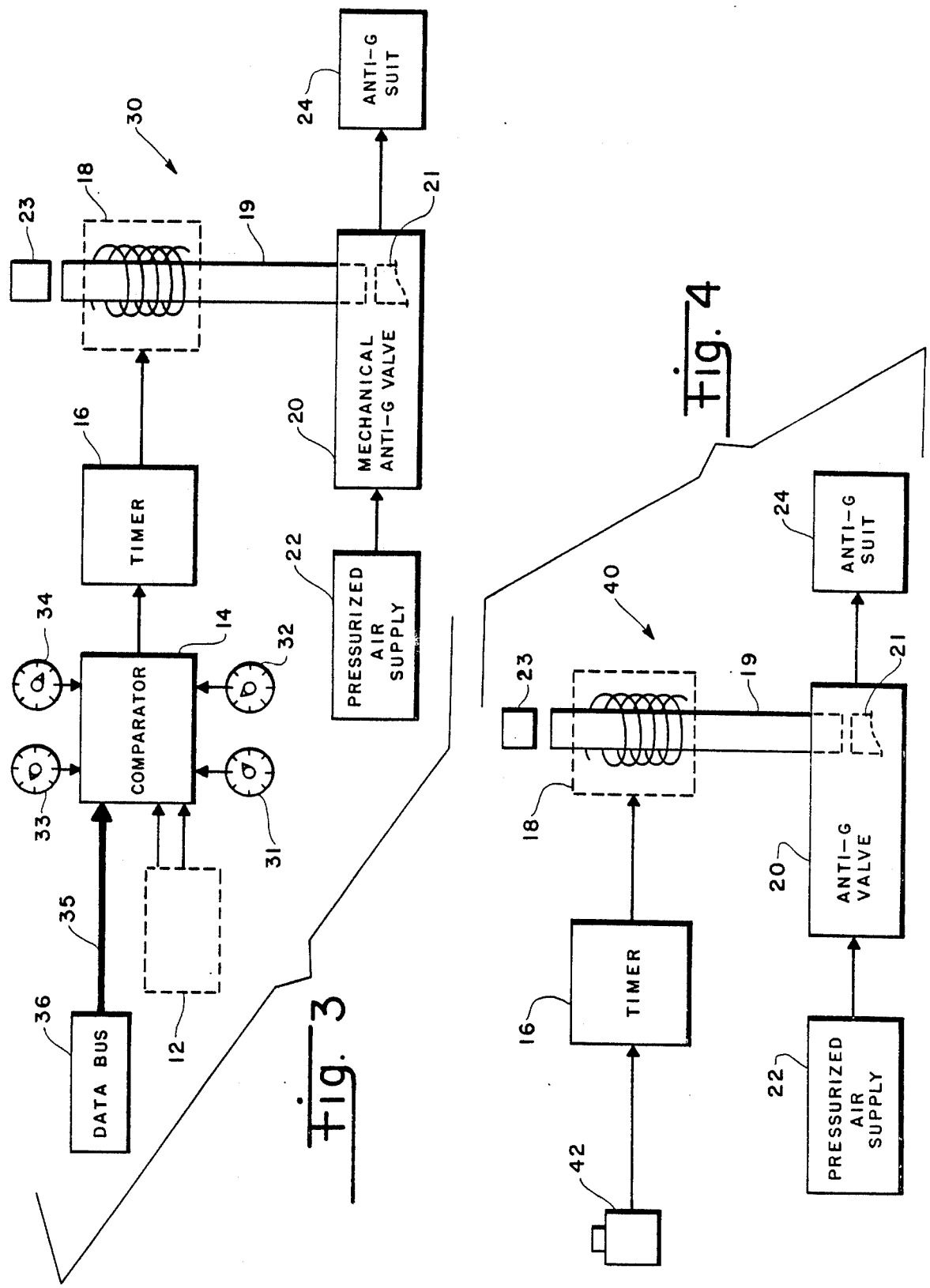

RAPID ACTING ELECTRO-PNEUMATIC ANTI-G SUIT CONTROL VALVE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to the field of anti-G suit valves, and more specifically to rapid response valves that quickly inflate an anti-G suit to protect pilots flying modern high performance fighter aircraft.

While flying simulated or actual combat maneuvers, a fighter pilot's body undergoes very high accelerations from the rapid changes in speed and direction. These accelerations are generally expressed in units of g, the acceleration of a mass at the surface of the Earth due to gravity. The accelerations of greatest concern to a pilot are those that occur along the vertical Z-axis of the cockpit when the pilot pulls back hard on the aircraft control stick to accomplish a rapid climb or a fast banked turn. The pilot's oxygen-carrying blood is forced away from its regular path between the heart-lungs and the brain, and pools toward the blood vessels of the lower extremities. At sufficiently high G's, the pilot's field of vision narrows as blood flow to the retinas is reduced, and the pilot will finally lose consciousness from insufficient blood flow to the brain.

Pilots fight the effects of high G's by straining maneuvers, tensing the muscles of their torso and extremities to squeeze shut the blood vessels and force blood flow to continue in the upper part of the body. An anti-G suit helps this process by covering the pilot's legs and torso with air bladders which can be inflated to compress the blood vessels in those regions and force blood flow to continue to the brain. A G-suit cannot remain continuously inflated or blood flow to the lower extremities would dangerously cease during low or no acceleration. Therefore, a valve controls the action of the anti-G suit to fill the air bladders only during periods of high G's.

Standard anti-G suit valves in use today are mechanical spring-mass controlled valves, providing pressurized air to the anti-G suit bladders at pressures proportional to acceleration. These valves, in order to avoid unacceptable suit inflation in rough air, incorporate a deadband of one or two G's before permitting pressurized air into the suit bladders. This deadband effect, along with the general sluggishness of the conventional valves, poses a danger to today's pilots because the standard valves cannot trigger quickly enough, or fill the suit bladders rapidly enough, to deal with the rates of acceleration onset achievable by modern high performance aircraft.

Some experienced pilots deal with this response slowness by manual control of the number of G's encountered during flight maneuvers. The pilot typically pulls the stick to a position known from experience to produce, for instance, six G's, a force that an experienced fighter pilot can tolerate immediately, then eases the stick back to cause further acceleration and higher G's as the G-suit bladders begin to fill. In this gradual onset environment, the pilot can observe his symptoms of loss of peripheral vision, tunneling of vision, greyout, and the onset of blackout in order to judge his physiological state, and to moderate his acceleration exposure accordingly.

However, modern jet fighters, such as an F-16, increasingly incorporate computer controlled flight control, or fly-by-wire, systems. In an F-16, the pilot signals through control stick movement a request for a maximum rate maneuver, the aircraft's computer determines what that rate should be, and institutes it immediately. Exposure to high rate of onset, high sustained acceleration without optimal protection places the pilot in an uniquely hazardous physiological environment leading to abrupt loss of consciousness with no warning symptoms because of the exhaustion of the brain's oxygen reserve.

The prior art includes improvements to the mechanically controlled, or inertial, anti-G valves to provide a faster response time. Inertial valves have been modified to make a high flow ready pressure valve that inflates the air bladders more rapidly. Developments have also been made in electronic servo feedback mechanisms for quicker triggering of the anti-G valve, as disclosed in U.S. Pat. No. 3,780,723 to the present inventor, and U.S. Pat. No. 4,243,024 to Crosbie, et al. These patents provide for measuring the rate of change of acceleration (dG/dt or G') as being an earlier predicter of imminent high G acceleration. The circuits in the two patents add G and G' to create a triggering signal that initiates inflation of the anti-G suit bladders after a threshold level of G, G', or a combined G and G', is exceeded. The circuits include a feedback signal from the anti-G suit of the air pressure in the bladders so that a desired suit pressure for a particular acceleration may be maintained. U.S. Pat. No. 4,336,590 to Jacq, et al. describes a microprocessor controlled anti-G suit valve that includes means for monitoring control stick movement to initiate inflation of the air bladders upon control stick movement that indicates imminent high acceleration.

These electronic anti-G valves are valuable improvements to the art, but they are extremely expensive and have not been implemented in actual aircraft. The high flow ready pressure mechanical valves have been incorporated in modern aircraft, but these valves still have a relatively slow response rate and suffer from failure to trigger quickly enough under high rates of acceleration onset. Attempts to improve the response rate of high flow ready pressure valves have been plagued by oscillations. It is thus seen that there is a need for an anti-G suit valve that successfully combines fast response and inflation with low cost and easy implementation so that it may find actual use in modern fighter aircraft.

It is, therefore, a principal object of the present invention to provide a rapidly responding anti-G suit valve that triggers quickly and inflates rapidly.

Another object of this invention is to provide an anti-G suit valve that is low in cost and easy to implement in existing fighter aircraft.

A feature of this invention is that it can be retrofitted as a modification to existing mechanical anti-G valves.

An advantage of this invention is that in case of failure the normal operation of the mechanical valve is not affected, providing a fail operational mode of operation.

Another advantage of this invention is that early initiation of anti-G suit inflation serves as a warning of imminent high acceleration to an otherwise actively engaged pilot.

These and other objects, features and advantages of the present invention will become apparent as the de-

SUMMARY OF THE INVENTION

In accordance with the foregoing principles and objects of the present invention, a novel anti-G valve system and method is described which measures acceleration, differentiates the acceleration to determine the rate of change of the acceleration, and when both the acceleration and rate of change of acceleration exceed preselected values, begins a preselected time period of substantially maximum rate delivery of pressurized air to an anti-G suit. Substantially maximum rate delivery of pressurized air to the anti-G suit can be obtained by energizing a solenoid to fully depress a valve spindle on a mechanical anti-G valve for the preselected time period, after which the mechanical anti-G suit returns to its normal operation.

Another embodiment of the invention, before beginning substantially maximum rate delivery of pressurized air, adds to preselected acceleration and rate of change of acceleration the requirement of detecting preselected signal values monitored from an aircraft data bus. A timer allows the substantially maximum rate delivery for a preselected period of time. A modification of this embodiment requires only the detection of preselected signal values monitored on the aircraft data bus to initiate delivery of pressurized air for the preselected period of time.

A manual embodiment incorporating the teachings of the present invention uses a manual determination of the immediate likelihood of rapid acceleration in a preselected direction and manual activation of the substantially maximum rate delivery of pressurized air to an anti-G suit. A timer automatically ceases maximum rate delivery of the pressurized air after a preselected period of time.

DESCRIPTION OF THE DRAWINGS

The present invention will be more clearly understood from a reading of the following detailed description in conjunction with the accompanying drawings wherein:

FIG. 3 is a schematic drawing of another embodiment of the invention used with a mechanical anti-G valve and conditioning the operation of the invention on the presence of preselected signal levels in the aircraft electronics system indicating imminent high acceleration.

FIG. 4 is a schematic drawing of a manual embodiment of the invention.

DETAILED DESCRIPTION

Figure 1:
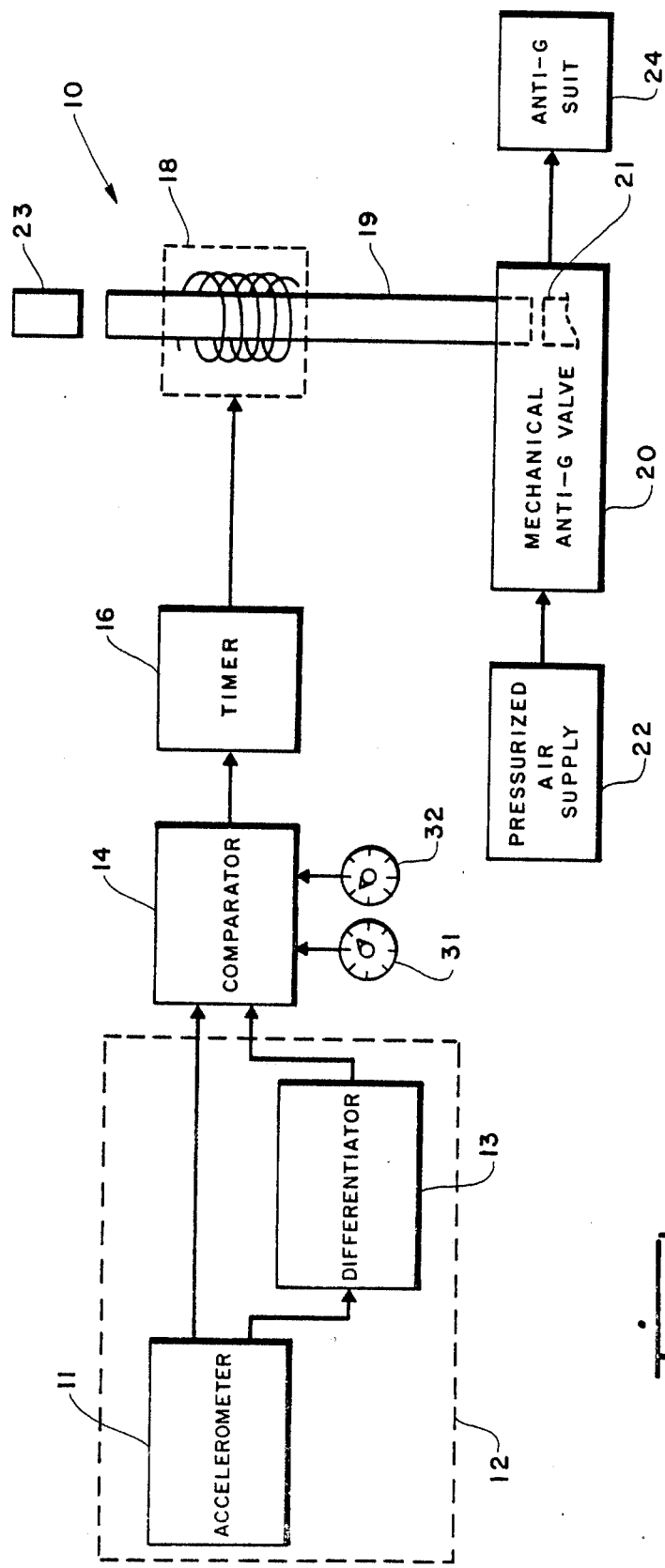
FIG. 1 is a schematic drawing of an embodiment of the invention used with a mechanical anti-G valve.

Referring now to FIG. 1 of the drawings, there is shown a schematic drawing of an embodiment 10 of the invention used with a mechanical anti-G valve 20. The invention is retrofitted to the mechanical anti-G valve 20 to more rapidly trigger inflation of an anti-G suit 24 in response to imminent high positive z-axis acceleration than is provided by the mechanical valve 20. This retrofit valve system works without interferring with the normal operation of the mechanical valve 20. The retrofit valve uses a solenoid 18 having a plunger 19 to depress a valve spindle 21 on the mechanical valve 20, fully opening the valve 20 and allowing the immediate maximum rate delivery of pressurized air from a pressurized air supply 22 to the anti-G suit 24. The plunger 19 replaces a press-to-test button 23, which is relocated to a position above the plunger 19.

In operation, an accelerometer 11, such as an Entran Model EGA-125-10D, is oriented to produce a signal proportional to acceleration in the positive Z or other selected axis. Two identical output signals are taken from the accelerometer 11. The first signal is input directly to a comparator circuit 14. The second signal is input to a differentiator circuit 13 to produce a signal proportional to the rate of change of acceleration, which is then input to the comparator 14. The comparator circuit 14 compares the signal levels from the accelerometer 11 and the differentiator 13, shown in combination as single element 12, with preselected trigger values 31 and 32 for acceleration and for rate of change of acceleration. In this embodiment, when both the level of acceleration output from accelerometer 11 reaches a first preselected value, and the level of the rate of change of acceleration output from differentiator 13 reaches a second preselected value, the comparator 14 outputs a trigger signal to the solenoid 18 to depress the valve spindle 21. Preselected values of $+1.5$ Gz for acceleration, and $+1.5$ G/sec. for rate of change of acceleration have worked well in tests. The trigger signal from the comparator 14 does not directly trigger the solenoid 18, but goes to a timer circuit 16 controlling a solenoid driver circuit portion of solenoid 18, causing the plunger 19 to depress the valve spindle 21 for a preselected period of time. Depressing the valve spindle 21 fully opens the mechanical valve 20 to allow delivery of pressurized air to the anti-G suit at the maximum possible rate. In this embodiment, the timer 16 allows the solenoid plunger 19 to continuously depress the valve spindle 21 for 2.5 seconds. Both conditions of $+1.5$ Gz acceleration and $+1.5$ G/sec. rate of change of acceleration must again be present for comparator 14 to allow solenoid 18 to be re-energized, re-activating full opening of the mechanical valve 20 for the preselected period of time. The requirement that both G and G' reach a preselected value before triggering takes place provides protection against unwanted anti-G suit inflation in rough air, while avoiding the sluggish operation of prior art valves.

After the quick response and maximum rate inflation of the anti-G suit 24 by operation of the embodiment shown in FIG. 1, the mechanical anti-G valve 20 reverts to its normal function, varying the air pressure in the suit according to the then level of +Gz acceleration unless the G and G' trigger requirements are again met, again firing the valve.

Figure 2:
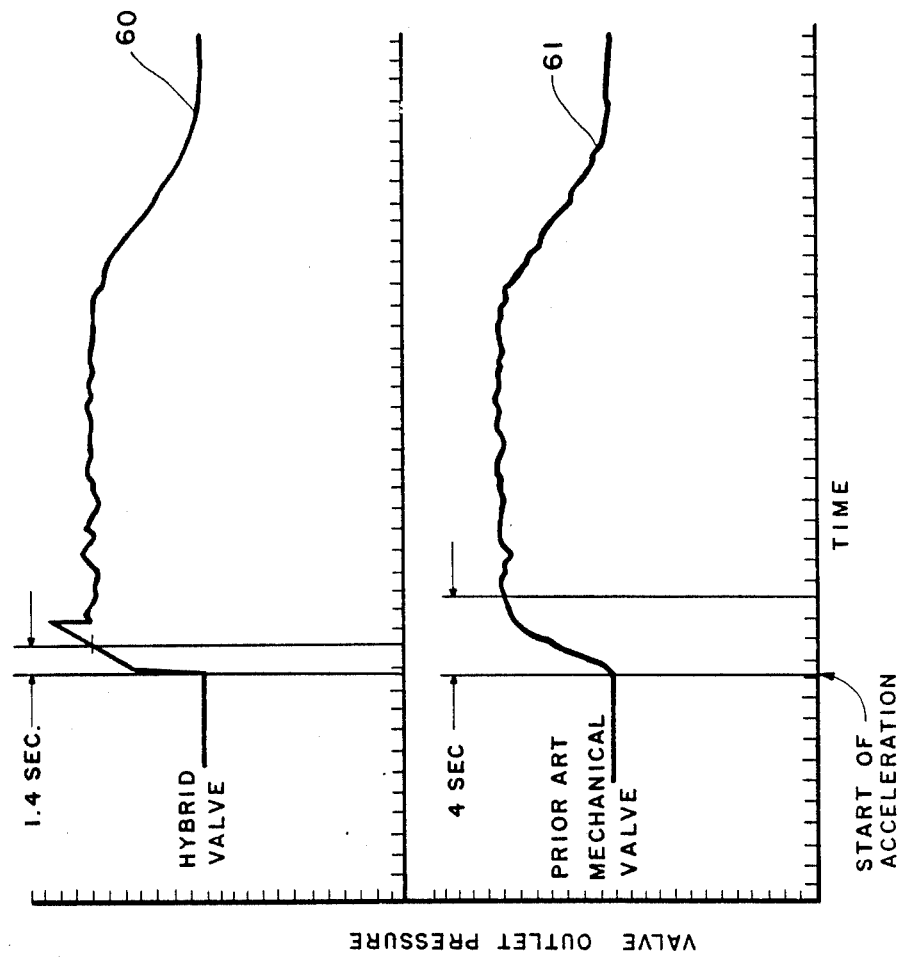
FIG. 2 is a graphical representation of anti-G valve outlet pressure versus time for a mechanical high flow valve and for a high flow valve retrofitted with the FIG. 1 embodiment of the present invention.

FIG. 2 is a graphical representation of anti-G valve outlet pressure versus time for a mechanical high flow valve and for a high flow valve retrofitted with the FIG. 1 embodiment of the present invention. Trace 61 represents the variation of valve outlet pressure over time for a standard high flow anti-G valve. Trace 60 represents the variation of valve outlet pressure over time for a hybrid valve, comprising a standard high flow anti-G valve retrofitted with a valve actuator incorporating the teachings of the present invention. Both tracings were obtained from centrifuge tests providing a 3 G/sec. onset rate for acceleration. The high flow valve had a trigger threshold of 1.25 to 1.5 G, delivering first stage pressure at a regulated 19 PSI. The new valve actuator had a trigger threshold of 2 G/sec. in the presence of the 3/G sec. onset rate. The preselected time duration for operation of the new valve actuator was 2.5 seconds. Comparison of the traces shows that the valve outlet pressure for the hybrid valve reached equilibrium outlet pressure in 1.4 seconds versus 4 seconds for the high flow only valve. The hybrid valve reached 50% of maximum anti-G suit pressure in only about 0.3 seconds. The pressure variations apparent in the traces 60 and 61 are from straining maneuvers exhibited by the test subjects.

Further centrifuge tests to measure tolerance to G-forces, measured as the maximum G-force at which test subject's visual angle subtended less than 60 degrees, showed that the hybrid valve provided an additional 1 G protection to relaxed test subjects over a standard high flow valve.

FIG. 3 is a schematic drawing of another embodiment 30 of the invention conditioning the operation of the new anti-G valve on the presence of preselected signal levels in the aircraft electronics system indicating imminent high acceleration. As in the FIG. 1 embodiment 10, accelerometer and differentiator 12 signals are input to the comparator 14. Additionally, preselected signals 35 from an aircraft data bus 36, such as a 1553 digital data bus, are also input to the comparator 14. The digital data bus 36 being monitored may be part of an aircraft computer control system, carrying information concerning flight control surfaces positions or engine thrust. It may be part of a weapons system status control, indicating whether or not weapons systems are engaged preparatory to combat. In this embodiment 30, the presence of preselected signal levels 33 and 34 from the set of signals 35 are required in addition to the preselected values of acceleration and rate of change of acceleration from accelerometer and differentiator 12 before the comparator 14 will send a trigger signal to timer 16. The preselected signal levels 33 and 34 may be those indicating existing or actual combat, or other signal levels the presence of which those skilled in the art may choose as preconditions before permitting triggering opening of the mechanical valve 20.

Alternatively, a variation of the FIG. 3 embodiment may have the comparator 14, instead of requiring the presence of preselected values of preselected signals 35 in combination with other required signals, trigger the start of timer 16 upon the presence of preselected values 33 and 34 of preselected signals 35 alone. The preselected signal values may include signals indicating an imminent high acceleration maneuver, or may be the actual signals commanding the maneuver, such as signals to flight control surfaces and engines. By triggering the operation of the invention when the presence of signals that almost always precede imminent actual acceleration are detected, significant additional G protection is provided.

It will be obvious to those with skill in the art that the comparator 14 and timer 16 may be replaced with a programmable central processing unit (CPU), preferably a microprocessor based system. The CPU would be capable of a high level of decision making based on various inputs. Thus, the novel features of this invention, described herein as various retrofit additions to a standard anti-G valve, may also be implemented as an integrated anti-G valve system providing, for example, that the programmable CPU, in addition to triggering the full opening of the valve, serve also to regulate the proportional pressurization now obtained through a mass-spring mechanism in the standard valve. In that embodiment, activation of the actual valve portion could be direct and not through the use of an outside plunger taking the place of the press-to-test button.

FIG. 4 is a schematic drawing of a manual embodiment 40 of the invention. Timer 16, instead of being started by a trigger signal from comparator 14 making an automatic determination based on previously determined parameters, is started by the operation of a pilot actuated pushbutton 42. The earliest knowledge that a high acceleration maneuver is imminent ordinarily lies with the pilot. If the pilot depresses a control stick mounted pushbutton 42 at the same time he initiates a control stick movement to begin an extreme maneuver, operation of the new valve and inflation of the pilot's anti-G suit will begin at the earliest possible time to protect the pilot prior to the actual experienced acceleration. Instructor pilots have known to reach back and depress the press-to-test button on a mechanical anti-G valve for their individual anti-G suit immediately prior to commanding a student pilot to begin a rapid maneuver. However, without the automatic timing functions of applicant's invention, the instructor pilot must manually monitor and control suit inflation. This is possible for an instructor pilot, but an unacceptable task for a pilot engaged in aerial combat.

It is understood that other modifications to the invention as described may be made, as might occur to one with skill in the field of this invention, within the intended scope of the claims. Therefore, all embodiments contemplated hereunder have not been shown in complete detail. Other embodiments may be developed without departing from the spirit of this invention or from the scope of the appended claims.

I claim:

1. An anti-G suit valve system for an anti-G suit, comprising:
   (a) means for delivering pressurized air to the anti-G suit;
   (b) means for activating the pressurized air delivering means;
   (c) acceleration measuring means;
   (d) differentiating means for determining from the output of the acceleration measuring means the rate of change of acceleration over time; and,
   (e) means for comparing the output of the acceleration measuring means to a first preselected acceleration value, for comparing the output of the differentiating means to a second preselected rate of change of acceleration over time value and for energizing the activating means for the pressurized air delivering means when both the output from the acceleration measuring means and the output from the differentiating means exceed, respectively, the first and second preselected values, wherein this means includes timing means responsive to the start of energization for controlling the length of time the activating means remains energized.

2. An anti-G suit valve system as described in claim 1, wherein the pressurized air delivering means comprises a pressurized air supply connected to mechanical anti-G valve means having moveable valve spindle means, whereby the valve spindle may be acted upon by an external force to open the mechanical anti-G valve means.

3. An anti-G suit valve system as described in claim 2, wherein the activating means for the pressurized air delivering means comprises a solenoid having plunger means operatively connected to depress the valve spindle means on the mechanical anti-G valve means when the solenoid is energized.

4. An anti-G suit valve system for an anti-G suit for use in an aircraft having a data bus, comprising:
(a) means for delivering pressurized air to the anti-G suit;
(b) means for maximumly activating the pressurized air delivering means to deliver pressurized air at substantially the maximum rate of the pressurized air delivering means;
(c) means for monitoring the data bus, for comparing the value of at least one preselected signal from the data bus to a preselected value for that signal and for energizing the maximumly activating means for the pressurized air delivering means when the presence of the preselected value of the preselected signal from the data bus monitoring means is detected, wherein this means includes timing means responsive to the start of energization for controlling the length of time the activating means remains energized.

5. An anti-G suit valve system for an anti-G suit, comprising:
(a) means for delivering pressurized air to the anti-G suit;
(b) means for maximumly activating the pressurized air delivering means to deliver pressurized air at substantially the maximum rate of the pressurized air delivering means; and,
(c) manually controlled means for energizing the activating means for the pressurized air delivering means, the energizing means including timing means responsive to the start of energization for controlling the length of time the activating means remains energized.

6. An anti-G suit valve system for an anti-G suit for use in an aircraft having a data bus, comprising:
(a) means for delivering pressurized air to the anti-G suit;
(b) means for activating the pressurized air delivering means;
(c) acceleration measuring means;
(d) differentiating means for determining from the output of the acceleration measuring means the rate of change of acceleration over time; and,
(e) means for comparing the output of the acceleration measuring means to a first preselected value, for comparing the output of the differentiating means to a second preselected value, for monitoring the data bus to compare the value of at least one preselected signal to a third preselected value for that signal and for energizing the activating means for the pressurized air delivering means when the output for the acceleration measuring means and the output from the differentiating means exceed, respectively, the first and second preselected values; and, the presence of the third preselected value of the preselected signal from the data bus monitoring means is detected, wherein this means includes timing means responsive to the start of energization for controlling the length of time the activating means remains energized.

7. A method of controlling delivery of pressurized air to an anti-G suit in an aircraft, comprising the steps of:
(a) determining the immediate likelihood of a rapid increase in acceleration of the aircraft in a preselected direction; and,
(b) activating a substantially maximum rate delivery of pressurized air to the anti-G suit for a preselected period of time after said determination is made.

8. The method as described in claim 7, further comprising the step of providing a pressurized air supply connected to mechanical anti-G valve means having moveable valve spindle means, whereby the valve spindle means may be depressed by an external force to open the mechanical anti-G valve means, wherein the step of activating a substantially maximum rate delivery of pressurized air comprises using a solenoid plunger to depress the valve spindle means on the mechanical anti-G valve means.

9. The method of controlling delivery of pressurized air to an anti-G suit according to claim 7, wherein the step of determining the immediate likelihood of a rapid increase in acceleration of the aircraft in a preselected direction further comprises the steps of:
(a) measuring the acceleration of the aircraft in a preselected direction;
(b) differentiating the measured acceleration to determine the rate of change of acceleration over time;
(c) comparing the acceleration to a first preselected acceleration value;
(d) comparing the rate of change of acceleration to a second preselected rate of change of acceleration over time value; and,
(e) ascertaining that both the acceleration and the rate of change of acceleration exceed, respectively, the first and second preselected values.

10. The method of controlling delivery of pressurized air to an anti-G suit according to claim 7, the aircraft further having a data bus, wherein the step of determining the immediate likelihood of a rapid increase in acceleration in a preselected direction of the aircraft further comprises the steps of:
(a) measuring the acceleration of the aircraft in a preselected direction;
(b) differentiating the measured acceleration to determine the rate of change of acceleration over time;
(c) comparing the acceleration to a first preselected value;
(d) comparing the rate of change of acceleration to a second preselected value;
(e) monitoring the data bus for the presence of preselected values of preselected signals; and,
(f) ascertaining when the acceleration and the rate of change of acceleration exceed, respectively, the first and second preselected values; and, at least one preselected value of at least one preselected signal from the data bus is detected.

11. The method of controlling delivery of pressurized air to an anti-G suit according to claim 7, the aircraft further having a data bus, wherein the step of determining the immediate likelihood of a rapid increase in acceleration in a preselected direction further comprises the steps of:
(a) monitoring the data bus for the presence of preselected values of preselected signals; and,
(b) ascertaining when at least one preselected value of at least one preselected signal from the data bus is detected.

12. The method of controlling delivery of pressurized air to an anti-G suit according to claim 7, wherein the step of activating a substantially maximum rate delivery of pressurized air to the anti-G suit for preselected period of time includes the steps of:
(a) manually initiating a substantially maximum rate delivery of pressurized air to the anti-G suit; and,
(b) manually measuring the length of time of delivery and ceasing delivery after a preselected length of time.

* * * * *